UNITED STATES PATENT OFFICE.

GEORGE D. WYCKOFF, OF PHILADELPHIA, PENNSYLVANIA, ASSIGNOR OF ONE-HALF HIS RIGHT TO WILLIAM J. RASIN, OF SAME PLACE.

IMPROVEMENT IN PROCESSES OF TREATING ORES.

Specification forming part of Letters Patent No. 186,222, dated January 16, 1877; application filed September 2, 1876.

*To all whom it may concern:*

Be it known that I, GEORGE D. WYCKOFF, of Philadelphia, in the county of Philadelphia and State of Pennsylvania, have invented a new and Improved Process of Treating Ores, and that the following is a full and complete specification thereof.

This invention relates to the treatment of ore-bearing rocks preparatory to the amalgamation of the ore with mercury, and has special reference to low-grade ores, or such as contain so small a percentage of metal as to render their working by other methods unprofitable.

I am aware that ores have been roasted to displace the sulphur and other impurities; but that process, as heretofore practiced, has been unprofitable as to ores of low grade, such as can be successfully worked by my improvement.

My invention consists in the treatment of ores by pulverization and thorough mixture with pulverized coal, and the subjection of this mixture to the necessary amount of heat in a retort or properly-constructed kiln, sufficient air being admitted to effect complete combustion of the coal.

That others may fully understand how to practice my invention I will particularly describe the method which I prefer, without, however, intending to confine myself to the specified details.

The ores as they come from the mines, or the tailings from previous workings, are crushed—usually by a Blake crusher—and are then mixed with finely-broken coal in proportions varying from twenty-five to fifty parts, by weight, of coal, to one hundred parts, by weight, of ore, according to the character of the ore to be treated. The carbonaceous and mineral mixture is then ground to a fine powder, usually between burr-stones, and is afterward spread in a layer, about one inch in thickness, over the hearth of a reverbatory furnace. The passage of the furnace-flame over this thin layer of carbonaceous and metallic matter immediately produces combustion therein, which may be intensified by the admission of atmospheric air in suitable volume through openings provided for that purpose. The extreme comminution of the ore and coal causes a correspondingly intimate mixture of the particles, and the metallic surfaces exposed during combustion are enormously increased. The chemical reactions are correspondingly rapid and complete. I am, therefore, enabled to drive off all the volatilizable base metals and sulphur so rapidly that their coalescence while in a state of fusion, and the formation of refractory masses, are entirely prevented.

When desulphurization is complete, the mass of reduced ore and ash is raked out of the furnace, reground, and submitted to the process of amalgamation.

The coals of Colorado and other metalliferous regions of the west are peculiarly adapted to this process, as they are very pure and burn with little residuum.

Having described my improvement, what I claim as new is—

The process of treating refractory ores, which consists in subjecting the mixed ore and coal, both suitably pulverized, to the direct action of flame on a reverberatory-furnace hearth, the treatment being continuous until the coal is entirely consumed. substantially as and for the purpose described.

GEO. D. WYCKOFF.

Witnesses:
WARREN M. RASIN,
GEORGE R. HEWITT.